(12) United States Patent  (10) Patent No.: US 8,047,357 B2
Braun et al.  (45) Date of Patent: Nov. 1, 2011

(54) CONVEYING DEVICE

(75) Inventors: Franz Braun, Schwandorf (DE); Roland Laumer, Regensburg (DE)

(73) Assignee: Krones AG, Neutraubling (DE)

( * ) Notice: Subject to any disclaimer, the term of this patent is extended or adjusted under 35 U.S.C. 154(b) by 327 days.

(21) Appl. No.: 12/371,982

(22) Filed: Feb. 17, 2009

(65) Prior Publication Data

US 2009/0211881 A1   Aug. 27, 2009

(30) Foreign Application Priority Data

Feb. 23, 2008 (DE) .......................... 10 2008 010 895

(51) Int. Cl.
 *B65G 47/84* (2006.01)
 *B67C 3/24* (2006.01)
(52) U.S. Cl. ............... 198/860.1; 198/469.1; 198/678.1; 198/860.3
(58) Field of Classification Search ............... 198/469.1, 198/678.1, 860.1, 860.3
See application file for complete search history.

(56) References Cited

U.S. PATENT DOCUMENTS

| 3,097,672 A * | 7/1963 | Minard .................... 141/142 |
| 6,058,985 A * | 5/2000 | Petri et al. .................. 141/168 |
| 7,731,022 B2 * | 6/2010 | Zepf .......................... 198/860.1 |
| 7,743,907 B2 * | 6/2010 | Weinbrenner et al. ..... 198/459.2 |

FOREIGN PATENT DOCUMENTS

| DE | 102005030058 | 1/2007 |
| WO | WO-2006087088 | 8/2006 |

OTHER PUBLICATIONS

German Search Report for DE 10 2008 010 895.2 dated Mar. 6, 2008.

* cited by examiner

*Primary Examiner* — Douglas Hess
(74) *Attorney, Agent, or Firm* — Marshall, Gerstein & Borun LLP

(57) ABSTRACT

A conveying device having a drive motor with motor shaft, a motor housing, and a load-receiving support stand, where to improve the conveying device in terms of simplified assembly and ease of maintenance, the motor housing is configured as part of the load-receiving support stand.

10 Claims, 4 Drawing Sheets

Detail "A"

US 8,047,357 B2

CONVEYING DEVICE

CROSS-REFERENCE TO RELATED APPLICATION

The present application claims the benefit of priority of German Patent Application No. 102008010895.2, filed Feb. 23, 2008. The entire text of the priority application is incorporated herein by reference in its entirety.

FIELD OF THE DISCLOSURE

The present disclosure relates to a conveying device, and particularly to the related drive motor, motor housing and support stand, such as used in container handling machines.

BACKGROUND

Such a conveying device is known from WO 2006/087088. The known conveying device is part of a transport system for container handling machines, particularly for bottle fillers. The transport system contains drivable inlet and outlet stars positioned on columnar support housings. The support housings are given a substantially tubular shape and accommodate, for instance, the drive motor for the conveying device together with its housing. The drive motor must be correctly adjusted at its predetermined place inside the outer support housing.

SUMMARY OF THE DISCLOSURE

It is an aspect of the present disclosure to design a conveying device of the aforementioned type such that it is easier to mount and maintain.

Owing to the design according to the disclosure, the motor, i.e. its housing, also assumes a static function as part of the support stand. As a result, the additional efforts taken in manufacturing and mounting a separate external housing can be omitted. The motor is always accessible for maintenance and/or repair purposes.

Owing to its shape the motor housing is ideally suited for use as part of a support column of a star wheel conveyor.

The design according to the disclosure is particularly suited for a direct drive, whereas the control unit for the motor can here also be accommodated in the motor housing as well.

By analogy with the support column of the generic prior art, the motor housing can be assembled with additional parts to form support stands that are optimally fitted to the conveying device to be supported, with the motor housing being fastened to the other parts expediently by way of screwing.

BRIEF DESCRIPTION OF THE DRAWINGS

Embodiments of the disclosure shall now be explained in more detail hereinafter with reference to the drawings, in which.

DETAILED DESCRIPTION OF THE PREFERRED EMBODIMENT

Figure 1:
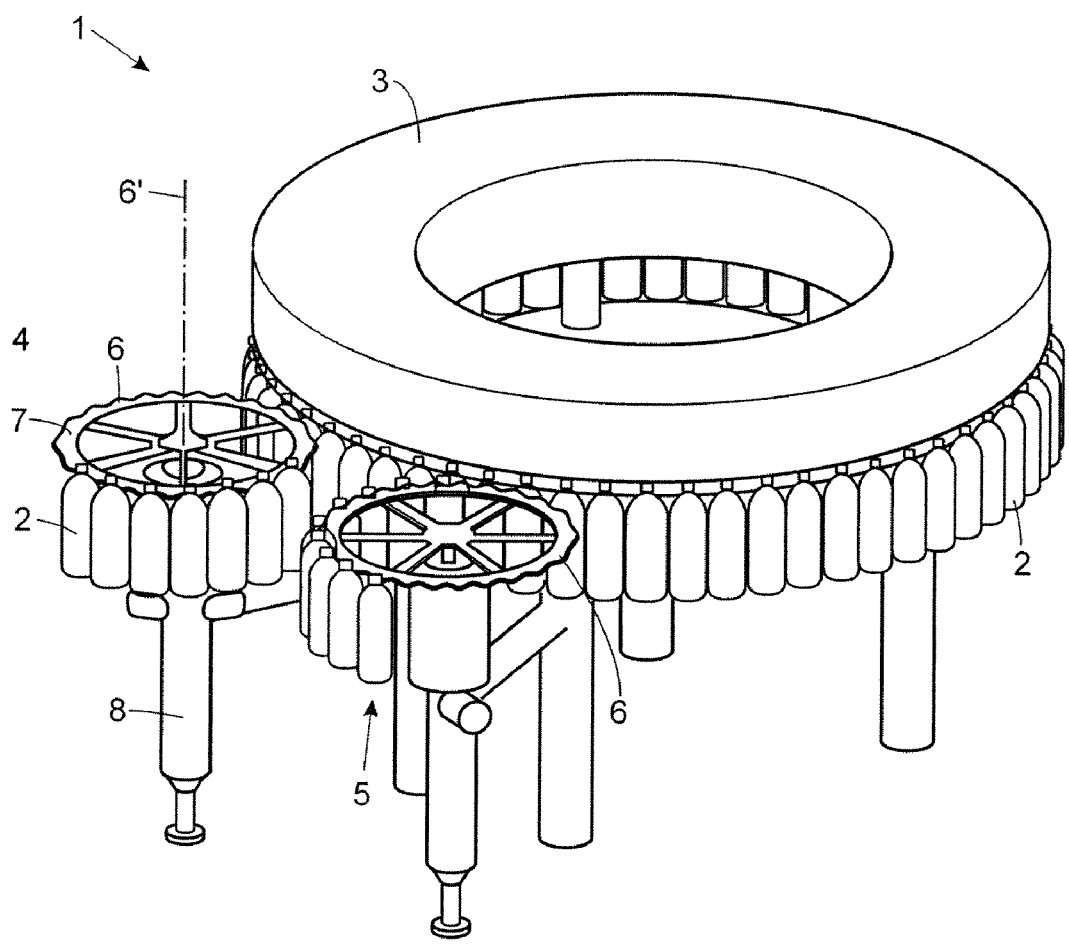
FIG. 1 is a perspective view of a transport system with a conveying device according to the disclosure.

FIG. 1 is a perspective and strongly schematized illustration showing a transport system 1 for handling beverage containers 2, particularly bottles, as the preferred field of application of the present disclosure. In the illustrated embodiment the transport system 1 contains a container handling machine 3, e.g. a bottle filler (without top boiler part). The containers 2 are supplied to the handling machine 3 via a first conveying device 4 and leave the handling machine 3 with the help of a second conveying device 5.

Both the handling machine 3 and the conveying devices 4 and 5 are shown in a very schematized form. What can however be seen is that both conveying devices 4, 5 are designed as star wheel conveyors, each comprising a conveying star 6 that is rotatingly driven about a vertical axis 6' and equipped on its circumference with a multitude of accommodating elements 7 by which the containers 2 can be gripped and guided and transported, respectively.

In the illustrated embodiment the containers 2 are bottles, and the accommodating elements 7 are designed for so-called "neck handling", i.e. the bottles are gripped in the region of their bottle neck, preferably underneath a bead provided on said neck, and conveyed along the predetermined conveying path. Since the two conveying devices 4, 5 are designed substantially identical, it is just the conveying device 4 that will be described hereinafter.

Furthermore, the conveying device 4 contains a support stand 8 with which the conveying star 6 is supported on a base, e.g. the floor.

Figure 2:
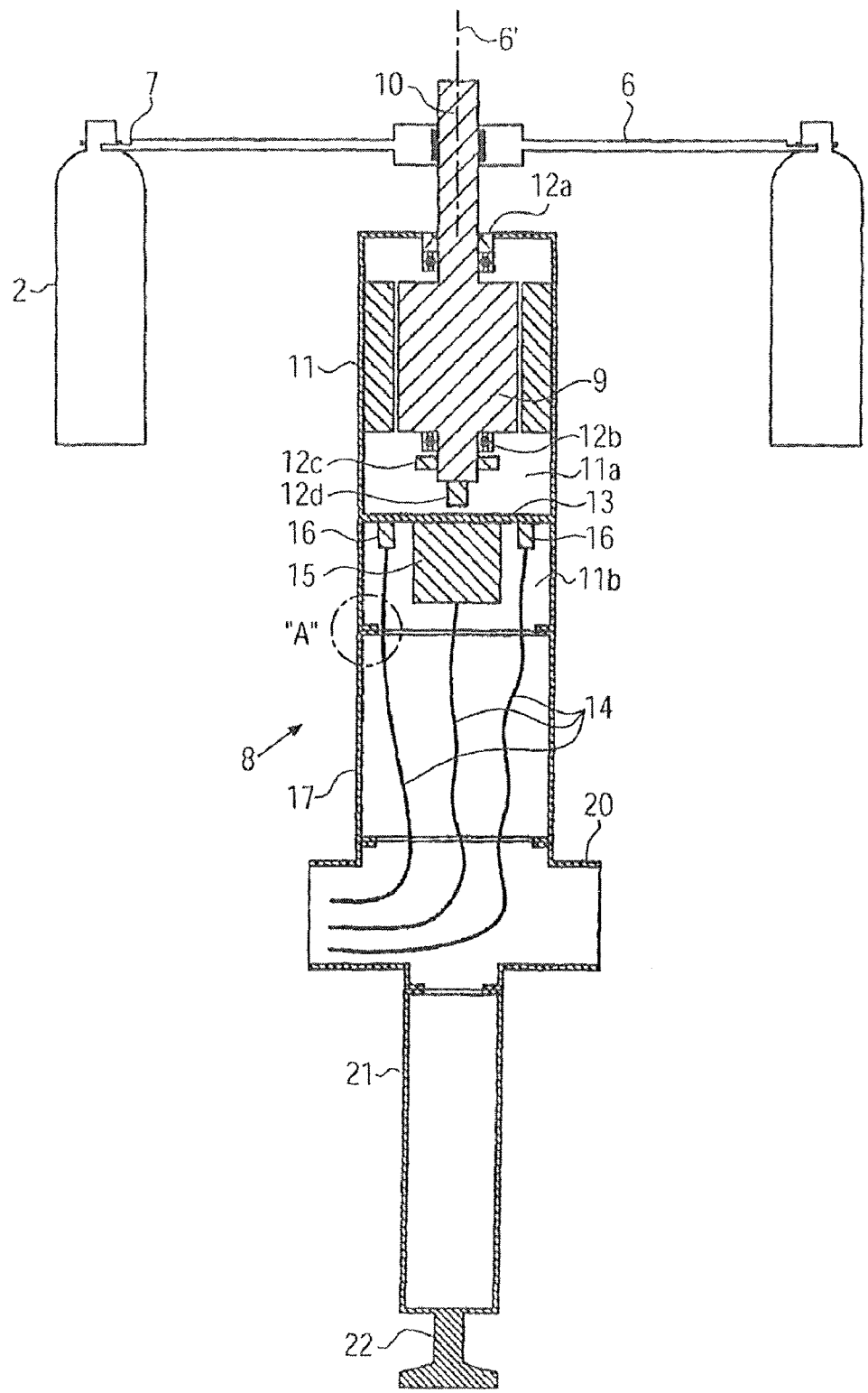
FIG. 2 shows a first embodiment of a conveying device in longitudinal section.

As becomes also apparent in connection with FIG. 2, the support stand 8 is configured as a support column that supports the star wheel 6 in the center. The support column of the support stand 8 comprises a drive motor 9 for the star wheel 6, which motor is configured in the illustrated embodiment for a direct drive of the star wheel 6. The motor 9 projects with its motor shaft 10 into the area of the star wheel 6, so that the star wheel 6 can be clamped or otherwise fastened to the motor shaft 10. The motor 9 contains a housing 11 which according to the disclosure is part of the support stand 8, i.e., apart from a holding and protecting function for the motor 9, it fulfills a static supporting function for the star wheel 6. For this purpose the motor 9 is fixed in the standard way inside the housing 11 at a predetermined place and is mounted with the housing 11 standing, with the motor shaft 10 extending through a preferably sealed bearing 12a on the upper front side of the motor housing 11. A further bearing 12b and optionally a brake 12c and a transmitter 12d are mounted on the bottom side.

The motor housing 11 may have any desired shape, but may be preferably cylindrical, particularly circular cylindrical. The motor housing 11 contains a preferably sealed compartment 11a in which the motor 9, the upper and lower bearing 12a, 12b, brake 12c. and transmitter 12d. are housed. The compartment 11a. is downwardly closed by a partition 13. The partition 13 forms a second compartment 11b. of the motor housing 11 that is downwardly open, so that supply lines 14 can be led in. The second compartment 11b. accommodates, for instance, a control device 15 and connections 16 for current, compressed air, or the like. With the compressed air the first compartment 11a. can be supplied with overpressure.

Depending on the necessary configuration, particularly the height, of the support stand 8, the motor housing 11 alone may be sufficient for fulfilling the function of the support stand 8 for supporting the conveyor star 6. Preferably, the motor housing 11, however, is only connected to part of the support stand 8 and connected to other support stand elements. In the illustrated embodiment, the support stand 8 contains a spacer 17, which is preferably adapted in form and diameter to the motor housing 11 and extends the motor housing 11 downwards. The spacer 17 and the further support stand elements to be still described hereinafter are preferably screwed to one another and to the motor housing 11.

Figure 4:
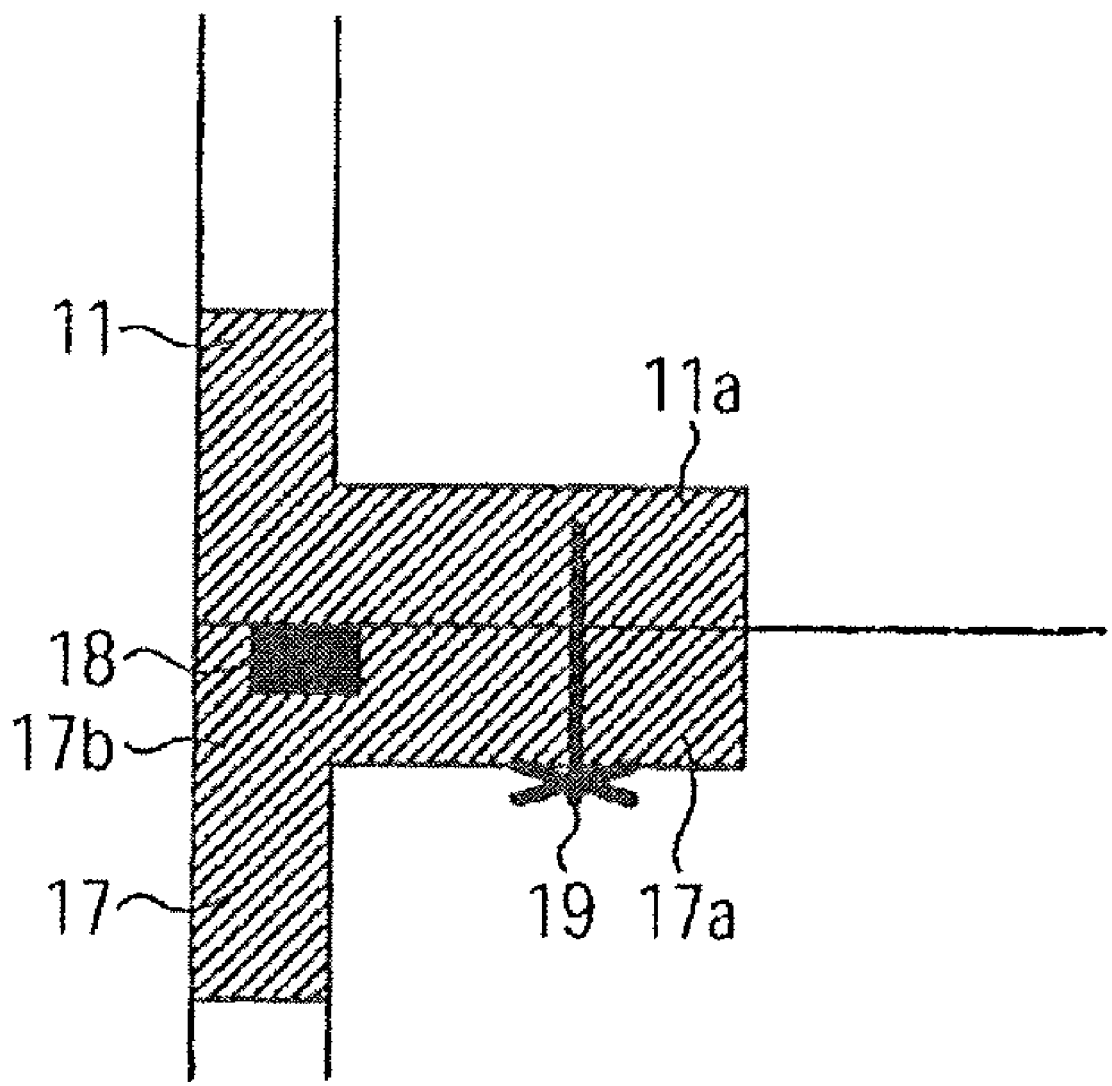
FIG. 4 is a detail view "A" taken from FIGS. 2 and 3.

A detail A of a connection is shown in FIG. 4. FIG. 4 shows the screw union between motor housing 11 and spacer 17. To this end both the motor housing 11 and the spacer 17 are each provided with an annular flange 11a, 17a, which are arranged one on top of the other with interposition of a seal 18, e.g. an O-ring, accommodated in a seal groove 17b, and screwed to one another with the help of standard screw connections 19. The screw union shown in FIG. 4 can be realized between all elements of the support stand 8.

A mounting element 20 is provided underneath the spacer 17 (or also underneath the motor housing 11) in the illustrated embodiment. The mounting element 20 is a kind of tubular intermediate piece and serves, on the one hand, the inlet and outlet, respectively, of the supply lines 14 and also serves as a connection piece for connecting the support stand 8 with the neighboring support stands of further conveying devices or to support stands of the associated handling machine, or the like.

The support stand 8 further contains a support leg 21, which may also have a tubular shape and is supported with a height adjusting element 22, here only shown schematically, on the floor.

Figure 3:
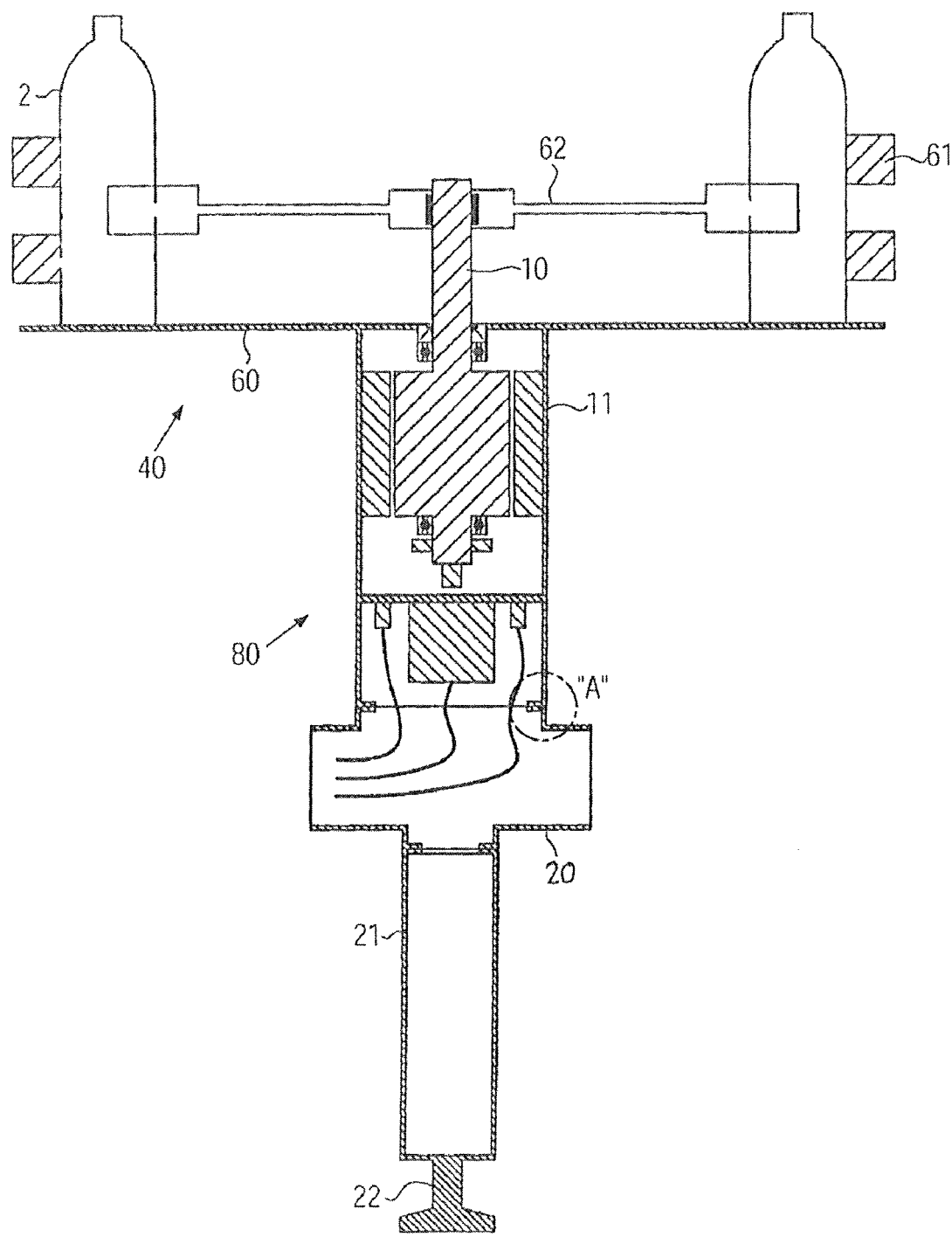
FIG. 3 shows a second embodiment of a conveying device according to the disclosure in longitudinal section.

FIG. 3 shows a further conveying device 40, which differs from the conveying device 4, 5 by a different type of transportation, wherein like or comparable components are identified with like reference numerals and need not be explained once again. The conveying device 40, which is configured as a star wheel conveyor, is designed for a floor-supported transportation of the containers 2, wherein a stationary support plate 60 is provided, on which stands are provided for the containers. A rail 61 provided on the circumference as well as mounts 62 arranged in star-like configuration serve to fix and guide the containers 2. The mounts 62 are configured as conveying elements and are in drive transmitting communication with the motor shaft 10. The motor housing 11, which is configured as part of a support stand 80, is firmly connected to the support plate 60. Since the support stand 80 of the conveying device 40 requires a smaller vertical height, the motor housing 11 is directly connected to the connection element 20, i.e. no spacer is provided. The remaining design with support leg 21 and the adjusting element 22 corresponds to the embodiment shown in FIG. 2.

In a modification of the described and designated embodiments the configuration of the support stand according to the disclosure can be used not only in star conveyors but also in other conveyors or in handling machines. The support stand need not necessarily be composed of tubular elements, but may e.g. also comprise solid struts arranged on the motor housing. Possibly, the motor housing alone can act as the support stand. Moreover, the control device can be accommodated outside the motor housing.

We claim:

1. A conveying device, comprising a star wheel, a drive motor, a motor shaft, a motor housing, and a load-receiving support stand, the support stand having a top end face, wherein the motor housing and the drive motor are secured in the interior of the support stand at a predefined point, and the motor shaft extends through a sealed bearing on the top end face of the support stand.

2. The conveying device according to claim 1, wherein the motor housing is part of a support column of a star wheel conveyor.

3. The conveying device according to claim 1, wherein the drive motor is configured as a direct drive.

4. The conveying device according to claim 1, wherein the motor housing comprises a control unit for the motor.

5. The conveying device according to claim 1, wherein the motor housing comprises connection elements for connection to other parts of the support stand.

6. The conveying device according to claim 5, wherein the connection elements contain a flange.

7. The conveying device according to claim 5, wherein the connection elements contain a seal.

8. The conveying device according to claim 1, wherein the support stand contains a spacer which is connected to the motor housing.

9. The conveying device according to claim 1, wherein the support stand contains a connection element which is connected to the motor housing.

10. The conveying device according to claim 1, wherein the motor housing is screwed to other parts of the support stand.

* * * * *